(No Model.)
C. H. STAEHLIN.
PLUMBER'S SHAVING HOOK AND SCRAPER.
No. 455,129. Patented June 30, 1891.
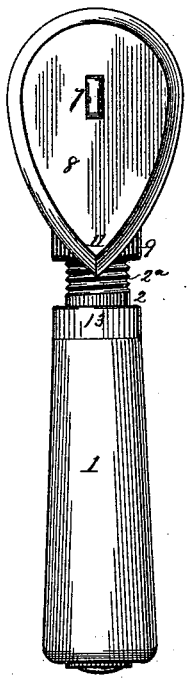
Fig. I.
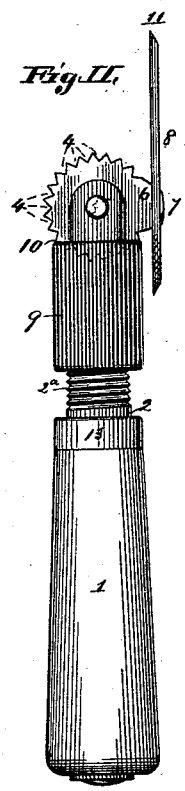
Fig. II.
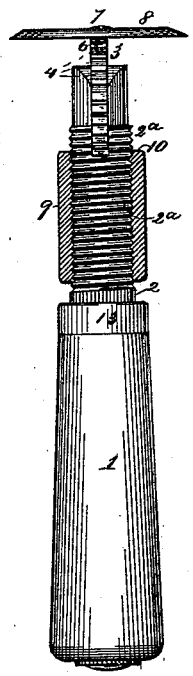
Fig. III.
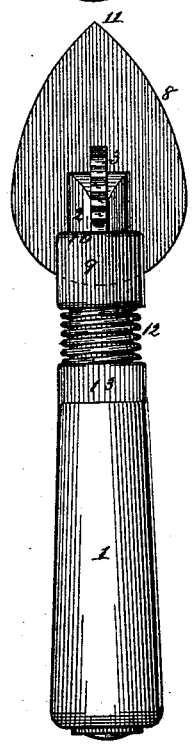
Fig. IV.
Attest:
Samuel H. Knight
George E. Cridee
Inventor:
Charles H. Staehlin.
By Knight Bros.
Attys

UNITED STATES PATENT OFFICE.

CHARLES H. STAEHLIN, OF ST. LOUIS, MISSOURI.

PLUMBER'S SHAVING-HOOK AND SCRAPER.

SPECIFICATION forming part of Letters Patent No. 455,129, dated June 30, 1891.

Application filed February 27, 1891. Serial No. 383,126. (No model.)

*To all whom it may concern:*

Be it known that I, CHARLES H. STAEHLIN, of the city of St. Louis, in the State of Missouri, have invented a certain new and useful Improvement in Plumbers' Adjustable Shaving-Hooks and Scrapers, of which the following is a full, clear, and exact description, reference being had to the accompanying drawings, forming part of this specification.

The scraper or shaver has a pivotal adjustment, so that it may be set at any angle with the handle or parallel therewith.

Figures I and II are side views of the tool, showing the cutter or scraper in different positions and viewed from different sides. Fig. III is part in side view and part in section, showing the scraper at right angles to the handle. Fig. IV is a side view of a modification.

1 is the handle, which may be of any size or description, adapted for use with one or both hands.

2 is a shank, having a screw-threaded part $2^a$ and mortised at the end to receive a disk 3, having notches 4 around the greater part of its circumference and turning on a pivot 5.

6 is a lug or projection upon the edge of the disk, the lug ending in a rivet-stud 7, that passes through a mortise in the scraper or shaving blade 8, and is riveted upon the outside of the scraper-blade.

9 is a nut or screw-sleeve upon the shank. The outer edge 10 of the nut is adapted to enter two of the notches 4 upon the periphery of the disk, and thus hold the disk firmly in whatever position it may be placed, the purpose being to hold the scraper-blade at any desired angle with the shank or parallel therewith, as may be required. It will be understood that the scraper-blade or scraper may always be more efficiently used in one position than another, such position varying according to circumstances. The means of adjustment is useful also to allow the scraper to be placed in a safe position, as seen in Fig. I, when the tool is not in use, the point 11 in such case being turned down close to the shank. The notches 4 are of course the proper distance asunder to allow the edge 10 of the nut or sleeve to fit closely in two of the notches in whatever position the disk may be placed, thus holding it with perfect rigidity.

In the form shown in Fig. IV the shank 2 and the sleeve 9 are not screw-threaded, and the sleeve fits neatly on the shank.

12 is a spiral spring surrounding the shank 2 between the sleeve and the ferrule 13 of the handle. This spring acts to push the sleeve of the disk 3 and the outer edge 10 into the notches of the disk. To change the position of the scraper, the sleeve is pushed down on the spring, and when the scraper has been put in the desired position the sleeve is released, so that the spring will push it outward to engage in the notches 4.

I claim as my invention—

1. In a shaving-hook or scraper, the combination of the handle 1, shank 2, secured thereto, and the scraper-blade hinged to the shank, for the purpose set forth.

2. The combination of the handle 1, the shank 2, the notched disk 3, and the nut or sleeve 9, substantially as and for the purpose set forth.

3. The combination of the handle 1, the shank 2, with screw-threaded portion $2^a$, nut 9, disk 3, pivoted in the shank and having peripheral notches 4, and the scraper-blade attached to the disk, for the purpose set forth.

CHAS. H. STAEHLIN.

In presence of—
SAML. KNIGHT,
BENJN. A. KNIGHT.